(12) United States Patent
Chen et al.

(10) Patent No.: US 8,275,929 B2
(45) Date of Patent: Sep. 25, 2012

(54) MEMORY AND OPERATING METHOD THEREOF

(75) Inventors: Chung-Kuang Chen, Taipei (TW); Han-Sung Chen, Hsinchu (TW); Chun-Hsiung Hung, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 589 days.

(21) Appl. No.: 12/260,258

(22) Filed: Oct. 29, 2008

(65) Prior Publication Data
US 2010/0103738 A1    Apr. 29, 2010

(51) Int. Cl.
*G06F 12/00*  (2006.01)
*G06F 13/00*  (2006.01)
*G06F 13/28*  (2006.01)
*G11C 11/34*  (2006.01)
*G11C 16/04*  (2006.01)

(52) U.S. Cl. ................... 711/103; 365/185.11

(58) Field of Classification Search .......... 711/102–103; 365/185.11
See application file for complete search history.

(56) References Cited

U.S. PATENT DOCUMENTS

| | | | |
|---|---|---|---|
| 6,014,755 A * | 1/2000 | Wells et al. | 714/6.13 |
| 2003/0048686 A1* | 3/2003 | Taura | 365/230.03 |
| 2006/0018166 A1* | 1/2006 | Iaculo et al. | 365/200 |
| 2007/0288686 A1* | 12/2007 | Arcedera et al. | 711/103 |
| 2008/0112204 A1* | 5/2008 | Mallikararjunaswamy | 365/94 |

* cited by examiner

*Primary Examiner* — Jared Rutz
*Assistant Examiner* — Ryan Bertram
(74) *Attorney, Agent, or Firm* — Thomas|Kayden

(57) ABSTRACT

A method of programming data stored in a memory, which comprises a number of user-defined blocks, a number of manufacture-defined blocks, and an information block, includes the following steps. A programming address pointing to a user-defined block in the memory and programming data is obtained. After that, it is determined whether there is an empty manufacture-defined block among a number of user-defined blocks in the memory. If so, an information block in the memory is programmed to store the programming address and a replacing address pointing to the empty manufacture-defined block. The empty manufacture-defined block is programmed to store the programming data.

10 Claims, 3 Drawing Sheets

MEMORY AND OPERATING METHOD THEREOF

BACKGROUND OF THE INVENTION

1. Field of the Invention

The invention relates in general to a memory, and more particularly to a one-time programmable (OTP) memory capable of modifying data already programmed in the OTP memory.

2. Description of the Related Art

Conventionally, read only memories (ROMs), such as one-time programmable (OTP) memories are widely used as a storing medium in a computer system. In comparison with the rewritable memories, the OTP memories are advantageously having lower manufacturing cost and the data stored therein are hardly lost. Thus, the OTP memories are widely used for storing start-up code of a computer system.

However, the OTP memories are characterized by that the data stored therein can only be programmed once. In other words, data modification on any of the memory block of the OTP memories is not allowed once the memory block is programmed. Thus, the conventional OTP memories are disadvantageously lack of data modification ability.

SUMMARY OF THE INVENTION

The invention is directed to a one-time programmable (OTP) memory and a data replacing method, a data programming method, and a data reading method. In comparison with the conventional OTP memory, the OTP memory provided in the invention is advantageously with data modification function.

According to a first aspect of the present invention, a method of programming data stored in an OTP memory, which comprises a number of manufacture-defined blocks, a number of user-defined blocks, and an information block, is provided. The method includes the following steps. A programming address pointing to a user-defined block in the OTP memory and programming data is obtained. After that, it is determined whether there is an empty manufacture-defined block among a number of manufacture-defined blocks in the OTP memory. If so, an information block in the OTP memory is programmed to store the programming address and a replacing address pointing to the empty manufacture-defined block. The empty manufacture-defined block is programmed to store the programming data.

According to a second aspect of the invention, a method of reading data stored in an OTP memory, which includes an information block, a manufacturer-defined block, and a user-defined block, is provided. The method includes the following steps. Firstly, a read address is obtained. Then the information block in the OTP memory is read to obtain a programming address, which points to a user-defined block in the OTP memory and a replacing address. It is then determined whether the read address corresponds to the programming address. If so, the manufacture-defined block, which is pointed to by the replacing address, in the OTP memory is read to obtain the data corresponding to the read address.

According to a third aspect of the invention, an OTP memory is provided and includes a memory array and a logic circuit. The memory array includes a manufacture-defined block, an information block, and a user-defined block. The logic circuit receives a programming address pointing to the user-defined block and programming data, and provides a replacing address pointing to the manufacture-defined block for storing the programming data.

The invention will become apparent from the following detailed description of the preferred but non-limiting embodiments. The following description is made with reference to the accompanying drawings.

DETAILED DESCRIPTION OF THE INVENTION

A one-time programmable (OTP) memory of an embodiment includes a logic circuit for programming a manufacture-defined block in the OTP memory to store replacing data corresponding to a user-defined block in the OTP memory and redirecting the read address pointing to the user-defined block to the manufacture-defined block.

Figure 1:
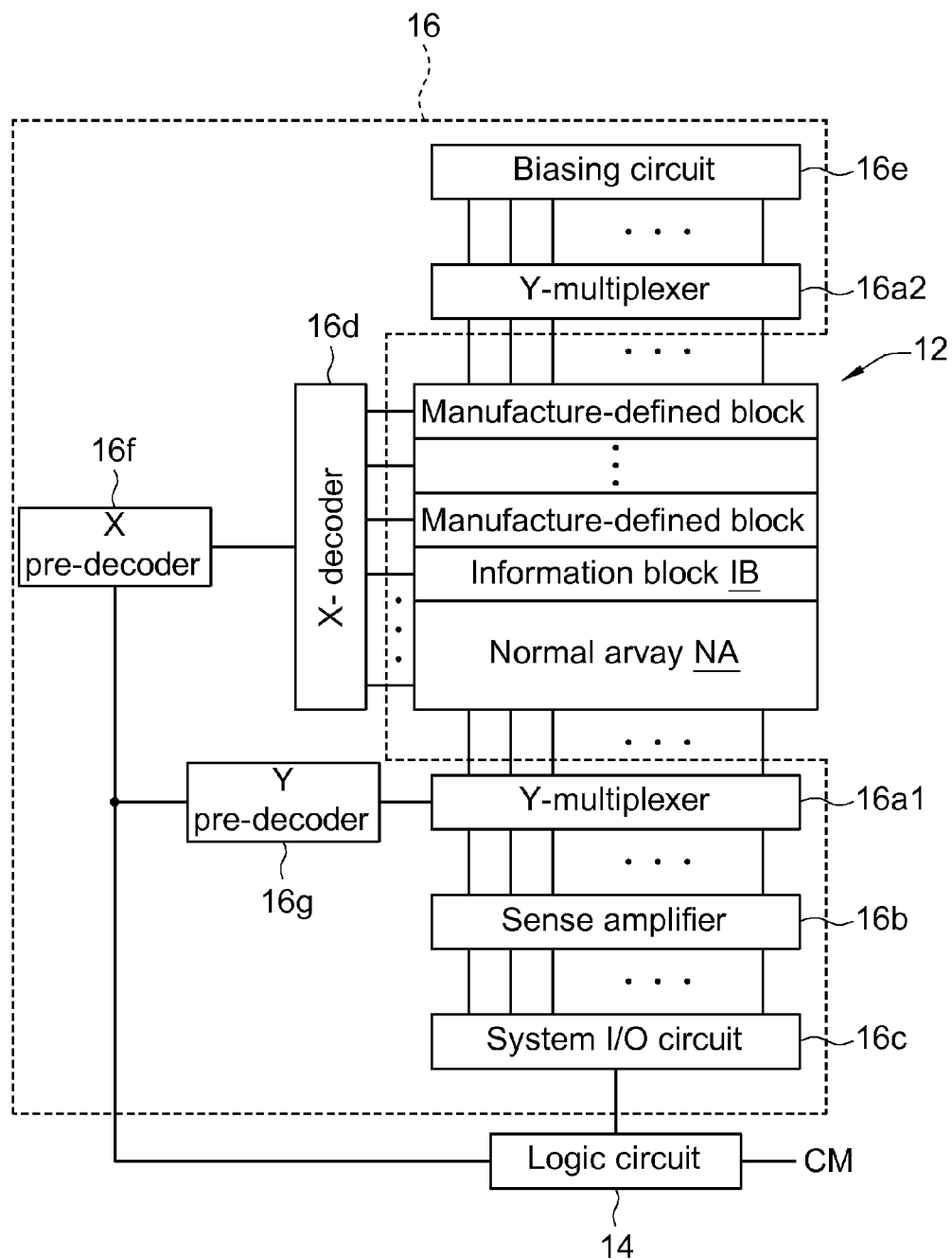
FIG. 1 is a block diagram of a one-time programmable memory according to an embodiment of the invention.

Referring to FIG. 1, a block diagram of a one-time programmable memory is shown according to the embodiment of the invention. The OTP memory 10 includes a memory array 12, a logic circuit 14, Y multiplexers 16$a$1, 16$a$2, sense amplifier 16$b$, system I/O circuit 16$c$, X decoder 16$d$, and biasing circuit 16$e$. The memory array 12 includes a normal array NA, an information block IB, and manufacture-defined blocks RB1-RBP, wherein P is a natural number. In an example, the normal array NA includes M user-defined blocks NB1-NBM, each of which includes a cell row with N cells, wherein M and N are natural numbers. The M user-defined blocks NB1-NBM are all programmed to store data. For example, the information block IB includes a cell row with N cells and each of the manufacture-defined blocks RB1-RBP includes a cell row with N cells.

In an example, the OTP memory 10 further includes X pre-decoder 16$f$ and Y pre-decoder 16$g$ for decoding the addresses provided by the logic circuit 14.

The logic circuit 14 receives an access command CM and accordingly provides a read address or program address to access the memory array 12. In an example, the logic circuit 14 is a state machine. The logic circuit 14 accesses a memory block in the memory array 12 via the corresponding circuits among the x-decoder 16$d$, the Y-multiplexer 16$a$1, 16$a$2, the sense amplifier 16$b$, the system I/O circuit 16$c$, the biasing circuit 16$e$, the X pre-decoder 16$f$ and the Y pre-decoder 16$g$.

In an example, the access command CM includes a program address Adrw, which points to the $i^{th}$ user-defined block NBi of the user-defined blocks NB1 to NBM and programming data Dataw, wherein i is a natural number smaller than or equal to M. The logic circuit 14 determines whether the user-defined block NBi is already programmed. When the user-defined block NBi is already programmed, the logic circuit 14 searches an empty manufacture-defined block among the manufacture-defined blocks RB1-RBP and provides a replacing address Adrp pointing to the empty manufacture-defined block. In an example, the empty manufacture-defined block is the $j^{th}$ manufacture-defined block RBj of the manufacture-defined blocks RB1-RBP, wherein j is a natural number smaller than or equal to P. Thus, the logic circuit 14 selects the manufacture-defined block RBj according to the replacing address Adrp and accordingly programs the manufacture-defined block RBj to store the programming data Dataw. The data stored in the manufacture-defined block RBj is for replacing data stored in the user-defined block NBi.

The control of the logic circuit 14 further programs the information block IB to store address data including the program address Adrw and the replacing address Adrp. The address data indicate that the user-defined block NBi is replaced and the corresponding replacing data are stored in the manufacture-defined block RBj.

Similar programming operation mentioned above can be carried out to replace data stored in any of the user-defined blocks NB1 to NBM until all the manufacture-defined blocks RB1 to RBP are all programmed with replacing data. For example, the information block IB is capable of storing the address data with P sets of program addresses and replacing addresses. In this example, the data replacing operation can be carried out on the memory array 12 for P times.

In other example, the access command CM includes a read address Adrr, which points to the $k^{th}$ user-defined block NBk of the M user-defined blocks NB1 to NBM, wherein k is a natural number smaller than or equal to M. Under the control of the logic circuit 14, the logic circuit 14 reads the address data stored in the information block IB and accordingly determines whether the read address Adrr corresponds to any of the program addresses stored in the address data. A read address may be set to relate to a corresponding program address in different manners. For examples, when the read address Adrr corresponds to the corresponding program address, the read address Adrr is mapped to the corresponding program address via a mathematical relationship; e.g. the read address is equal to the corresponding program; the corresponding program address plus or minus an offset value, or twice of the corresponding program address. When the read address Adrr corresponds to one of the program addresses included in the address data, the logic circuit 14 determines the user-defined block NBk is replaced. When the read address Adrr does not correspond to any of the program addresses included in the address data, the logic circuit 14 determines the user-defined block NBk is not replaced.

When the user-defined block NBk is replaced, the logic circuit 14 obtains the replacing address corresponding to the program address, which corresponds to the read address Adrr. In an example, when the read address Adrr corresponds to the program address Adrw stored in the address data, the logic circuit 14 determines the read user-defined block NBk (k=i) is replaced. The logic circuit 14 further obtains the replacing address Adrp pointing to the manufacture-defined block RBj according to the address data. Thus, instead of reading the user-defined block NBk to obtain the data, the logic circuit 14 selects and reads the manufacture-defined block RBj to obtain the data according to the replacing address Adrp.

Figure 2:
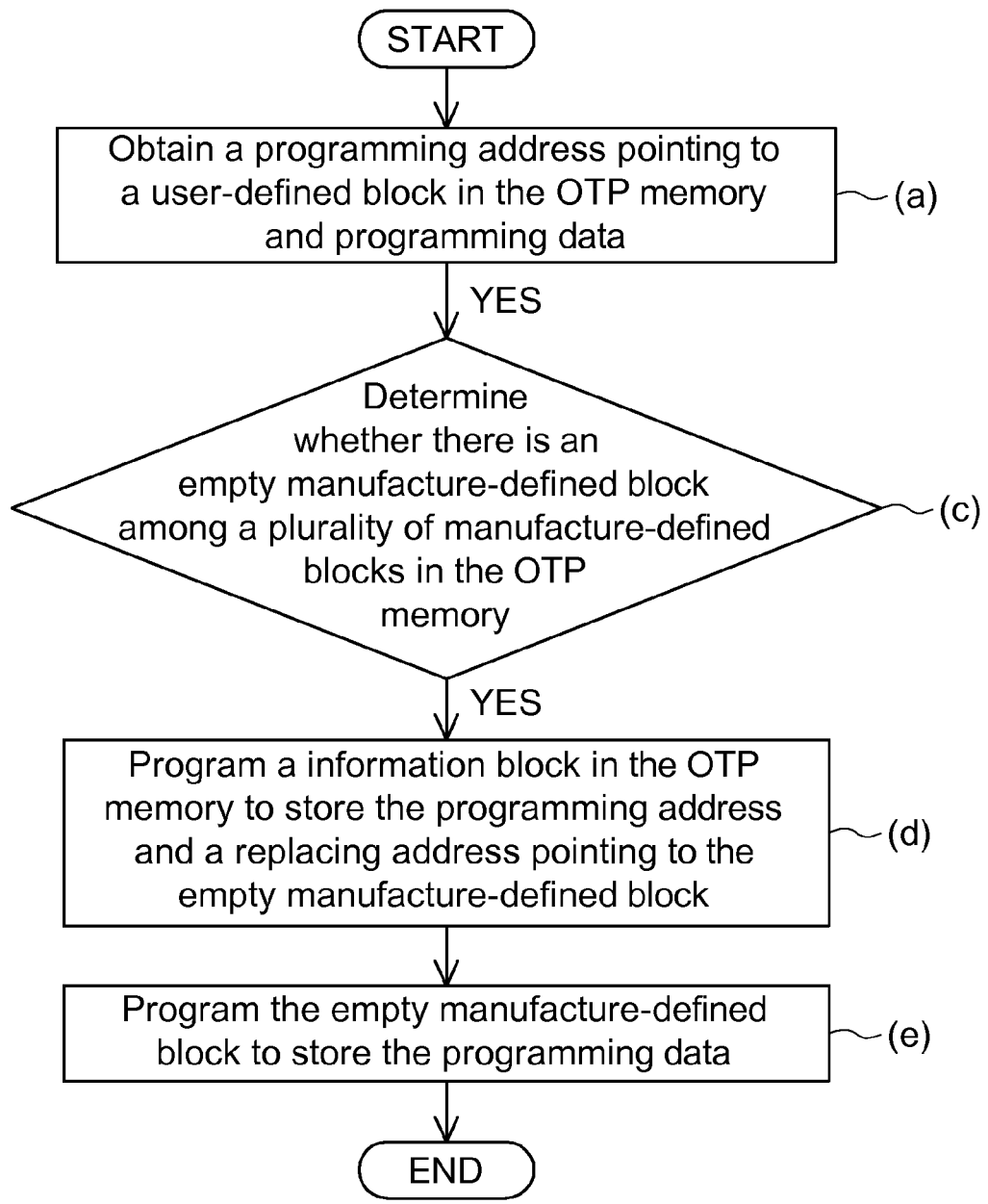
FIG. 2 is a flow chart of a method of replacing data stored in a one-time programmable memory according to an embodiment of the invention.

Referring to FIG. 2, a flow chart of a method of replacing data stored in a one-time programmable memory is shown according to an embodiment of the invention. The method of replacing data stored in an OTP memory includes the following steps. The method begins at step (a), the logic circuit 14 obtains the replacing address Adrp pointing to a user-defined block NBi in the memory array 12 and the programming data Dataw.

Next, the method proceeds to step (b), the logic circuit 14 determines whether there is an empty manufacture-defined block among the manufacture-defined blocks RB1 to RBP. If so, performing step (c), the logic circuit 14 obtains the replacing address Adrp pointing to the searched empty manufacture-defined block, for example, the manufacture-defined block RBj. Under the control of the logic circuit 14, the memory controller 16 programs the information block IB to store the programming address Adrw and the replacing address. Next, the method proceeds to step (d), the logic circuit 14 further provides the replacing address Adrp and the programming data Dataw to the memory controller 16, which accordingly programs the manufacture-defined block RBj to store the programming data Dataw.

In an example, when there is no empty manufacture-defined block among the manufacture-defined blocks RB1 to RBP, the method of replacing data stored in an OTP memory comes to an end.

Figure 3:
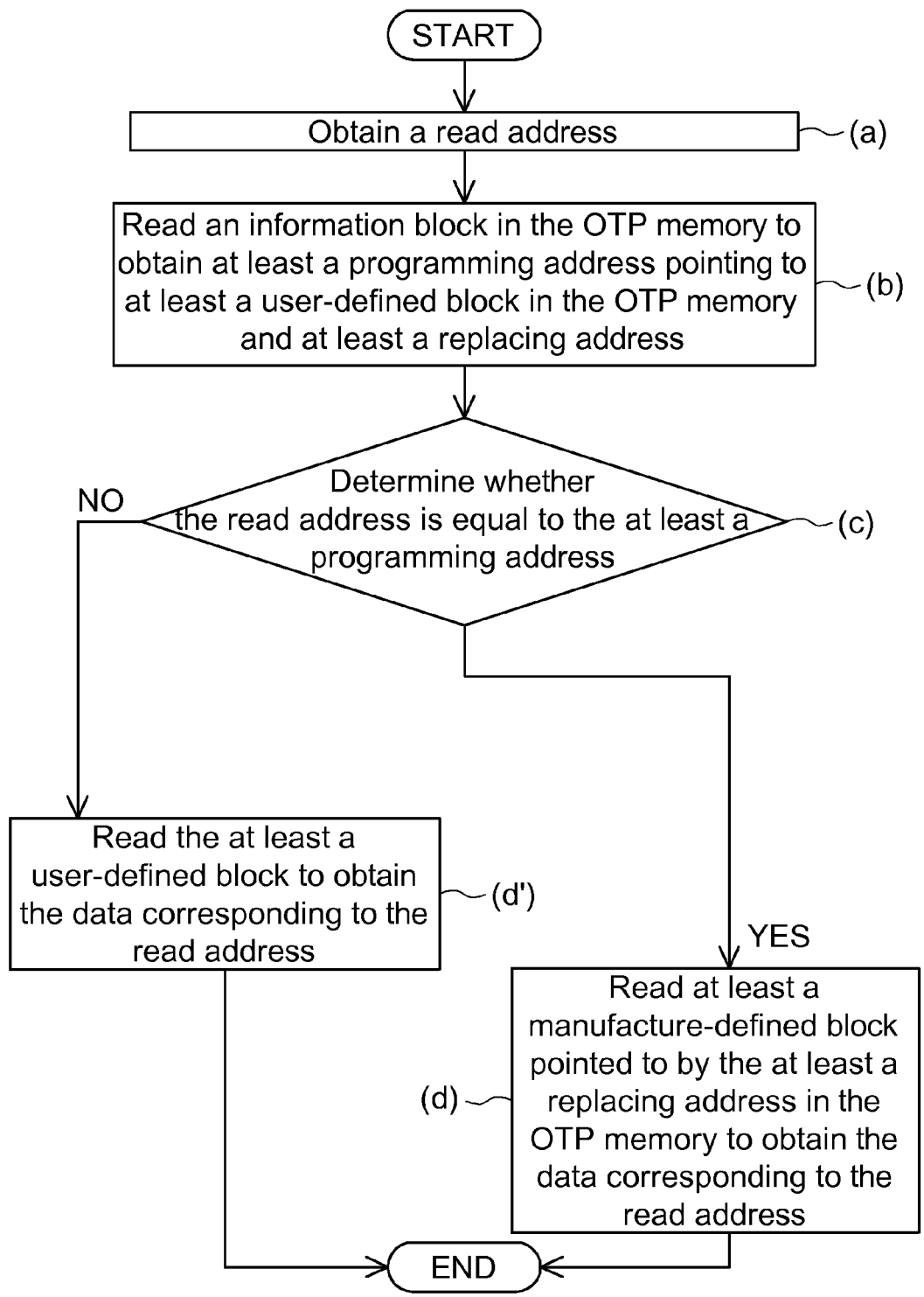
FIG. 3 is a flow chart of the method of reading data stored in a one-time programmable memory according to an embodiment of the invention.

Referring to FIG. 3, a flow chart of the method of reading data stored in a one-time programmable memory is shown according to an embodiment of the invention. The method of reading data stored in an OTP memory includes the following steps. The method begins at step (a), the logic circuit 14 obtains the read address Adrr. Next, the method proceeds to step (b), the logic circuit 14 reads the information block IB to obtain the address data. For example, the address data includes the programming address Adrw pointing to the user-defined block NBi in the memory array 12 and the replacing address Adrp pointing to the manufacture-defined block RBj.

Then, the method proceeds to step (c), the logic circuit 14 determines whether the read address Adrr corresponds to the programming address Adrw. If yes, performing step (d), the logic circuit 14 reads the manufacture-defined block RBj to obtain the data corresponding to the read address Adrr.

In other example, the method of reading data stored in an OTP memory further includes step (d'), if the read address Adrr does not correspond to the programming address Adrw, the logic circuit 14 reads the user-defined block NBi to obtain the data corresponding to the read address Adrr.

Although each of the manufacture-defined blocks RB1 to RBP has memory cells arranged in 1×N matrix (that is a cell row) in the present embodiment, the manufacture-defined blocks are not limited thereto. In other examples, the memory cells in the manufacture-defined blocks can also be arranged in 2×N, 3×N, ..., M×N, M×1, M×2, ..., or M×N−1 matrices. Preferably, the manufacture-defined blocks and the user-defined blocks have a same matrix size.

In an example, each of the cells in the memory array 12 includes a metal oxide semiconductor (MOS) transistor, a diode circuit, or a fuse circuit.

In the present embodiment, a logic circuit is included in the OTP memory for programming a manufacture-defined block in the OTP memory to store replacing data corresponding to a user-defined block in the OTP memory. The logic circuit further redirects the read address pointing to the user-defined block to the manufacture-defined block. Therefore, the OTP memory of the present embodiment is advantageously with data modification function in comparison with the conventional OTP memory and can re-modify data in the OTP memory for at least once.

While the invention has been described by way of examples and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A method of programming data in a memory, the memory comprising a plurality of manufacture-defined blocks, a plurality of user-defined blocks and an information block, the method comprising steps of:
obtaining a programming address pointing to a user-defined block in the memory and programming data;

determining whether the user-defined block is already programmed and cannot be erased; and if the user-defined block is already programmed and cannot be erased, searching an empty manufacture-defined block among the manufacture-defined blocks, storing the programming address and a replacing address pointing to the empty manufacture-defined block to an information block, and storing the programming data to the empty manufacture-defined block, wherein, the manufacture-defined block is implemented with one of a replacing cell row and a replacing cell column, and the manufacture-defined block and the user-defined block have a same matrix size; and the manufacture-defined blocks and the user-defined blocks are implemented with one time programmable (OTP) memory blocks.

2. The method according to claim 1, further comprising step of:

storing the programming data to the user-defined block if the user-defined block is not programmed.

3. A method of reading data stored in a memory, the memory comprising an information block, a user-defined block and a manufacture-defined block, the method comprising steps of:

obtaining a read address;

reading the information block in the memory to obtain a programming address, which points to the user-defined block, and a replacing address, wherein the user-defined block pointed by the programming address in the information block is already programmed and cannot be erased;

determining whether the read address corresponds to the programming address; and reading the manufacture-defined block to obtain the data corresponding to the read address if the read address corresponds to the programming address, wherein, the manufacture-defined block is implemented with one of a replacing cell row and a replacing cell column, and the manufacture-defined block and the user-defined block have a same matrix size; and the manufacture-defined blocks and the user-defined blocks are implemented with one time programmable (OTP) memory blocks.

4. The method according to claim 3, further comprising step of:

reading the user-defined block to obtain the data if the read address does not correspond to the replacing address.

5. A memory, comprising:

a memory array, comprising a manufacture-defined block, an information block, and a user-defined block; and a logic circuit, for receiving a programming address pointing to the user-defined block and programming data, determining whether the user-defined block is already programmed, and when the user-defined block is already programmed, providing a replacing address pointing to the manufacture-defined block for storing the programming data, wherein, the manufacture-defined block is implemented with one of a replacing cell row and a replacing cell column, and the manufacturer-defined block and the user-defined block have a same matrix size.

6. The memory according to claim 5, wherein the logic circuit further stores the program address and the replacing address in the information block indicating the user-defined block is replaced.

7. The memory according to claim 5, wherein:

when the logic circuit receives a read address pointing to the user-defined block, the logic circuit determines whether the user-defined block is replaced according to the program address and the replacing address in the information block or not; and the logic circuit reads the manufacture-defined block to obtain the programming data according to the replacing address.

8. The memory according to claim 5, wherein each memory cell of the memory array is a metal oxide semiconductor (MOS) transistor.

9. The memory according to claim 5, wherein each memory cell of the memory array is a diode device.

10. The memory according to claim 5, wherein each memory cell of the memory array is a fuse device.

* * * * *